United States Patent [19]
Yamashita

[11] Patent Number: 5,159,488
[45] Date of Patent: Oct. 27, 1992

[54] OPTICAL VIDEO DISC PLAYER
[75] Inventor: Noriyuki Yamashita, Tokyo, Japan
[73] Assignee: Sony Corporation, Tokyo, Japan
[21] Appl. No.: 507,304
[22] Filed: Apr. 10, 1990
[30] Foreign Application Priority Data
Apr. 13, 1989 [JP] Japan .................................. 1-093383
[51] Int. Cl.⁵ .............................................. H04N 5/95
[52] U.S. Cl. .................... 358/338; 358/342; 358/335
[58] Field of Search ............... 358/342, 338, 335, 310, 358/312, 320, 321, 322, 324, 907, 325, 326, 327; 360/10.1, 69, 36.1, 70, 71, 72.1, 72.2, 72.3; 369/32, 43, 44.28, 50

[56] References Cited
U.S. PATENT DOCUMENTS

| | | | |
|---|---|---|---|
| 4,598,394 | 7/1986 | Nonaka | 358/342 |
| 4,701,898 | 10/1987 | Giddings | 358/342 |
| 4,725,898 | 2/1688 | Tokuyama | 360/10.1 |
| 4,763,205 | 9/1988 | Okano | 358/338 |
| 4,774,699 | 9/1988 | Giddings | 358/342 |
| 4,800,447 | 1/1989 | Toba | 358/338 |
| 4,811,317 | 3/1989 | Barnard et al. | 358/338 |
| 4,845,572 | 7/1989 | Yasuda | 358/342 |
| 4,845,697 | 7/1989 | Giddings | 358/342 |
| 4,887,253 | 12/1989 | Tateishi | 358/342 |
| 4,910,722 | 3/1990 | Kaji et al. | 369/32 |
| 4,918,676 | 4/1990 | Miyasaka | 369/32 |
| 4,949,322 | 8/1990 | Kimura et al. | 369/32 |
| 4,958,244 | 9/1990 | Inazawa et al. | 369/32 |

Primary Examiner—Dale M. Shaw
Assistant Examiner—Thai Tran
Attorney, Agent, or Firm—Philip M. Shaw, Jr.

[57] ABSTRACT

A video disc recorded according to a constant linear velocity (CLV) format at high speed is scan reproduced using three kinds of track jumps, of varying numbers of tracks, by the photo pickup head so that the synchronization defects inherent in the prior art can be eliminated. A video player is also provided.

11 Claims, 12 Drawing Sheets

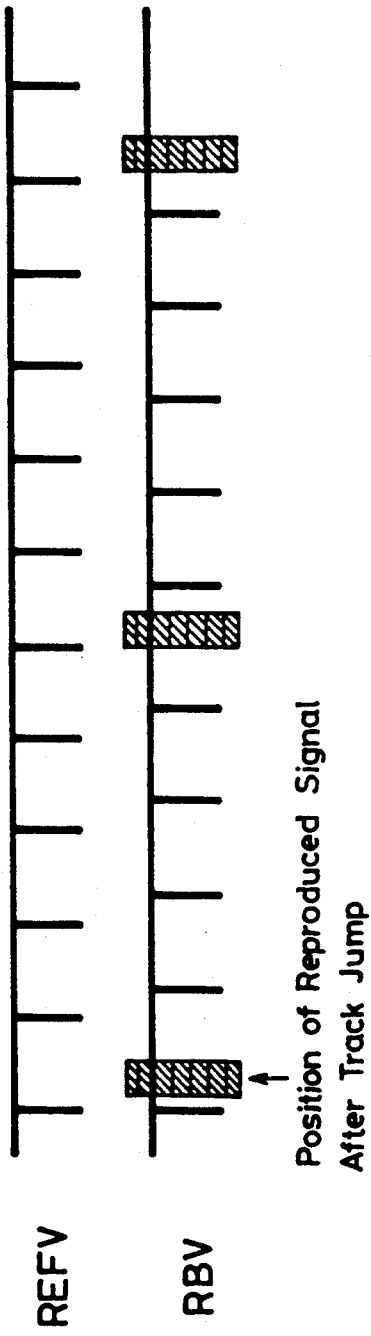
FIG. 5 (PRIOR ART)
REFV
RBV
Position of Reproduced Signal After Track Jump
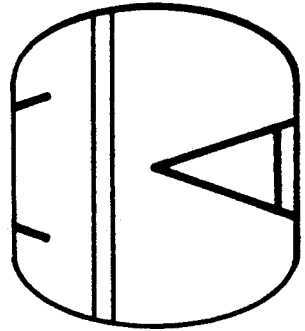
FIG. 6A (PRIOR ART)
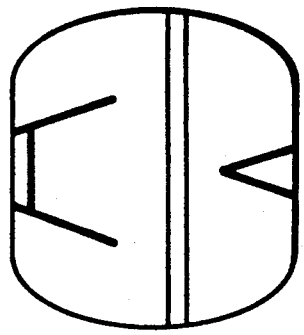
FIG. 6B (PRIOR ART)
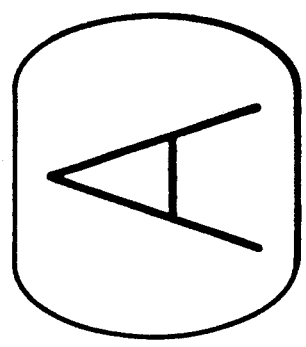
FIG. 6C (PRIOR ART)

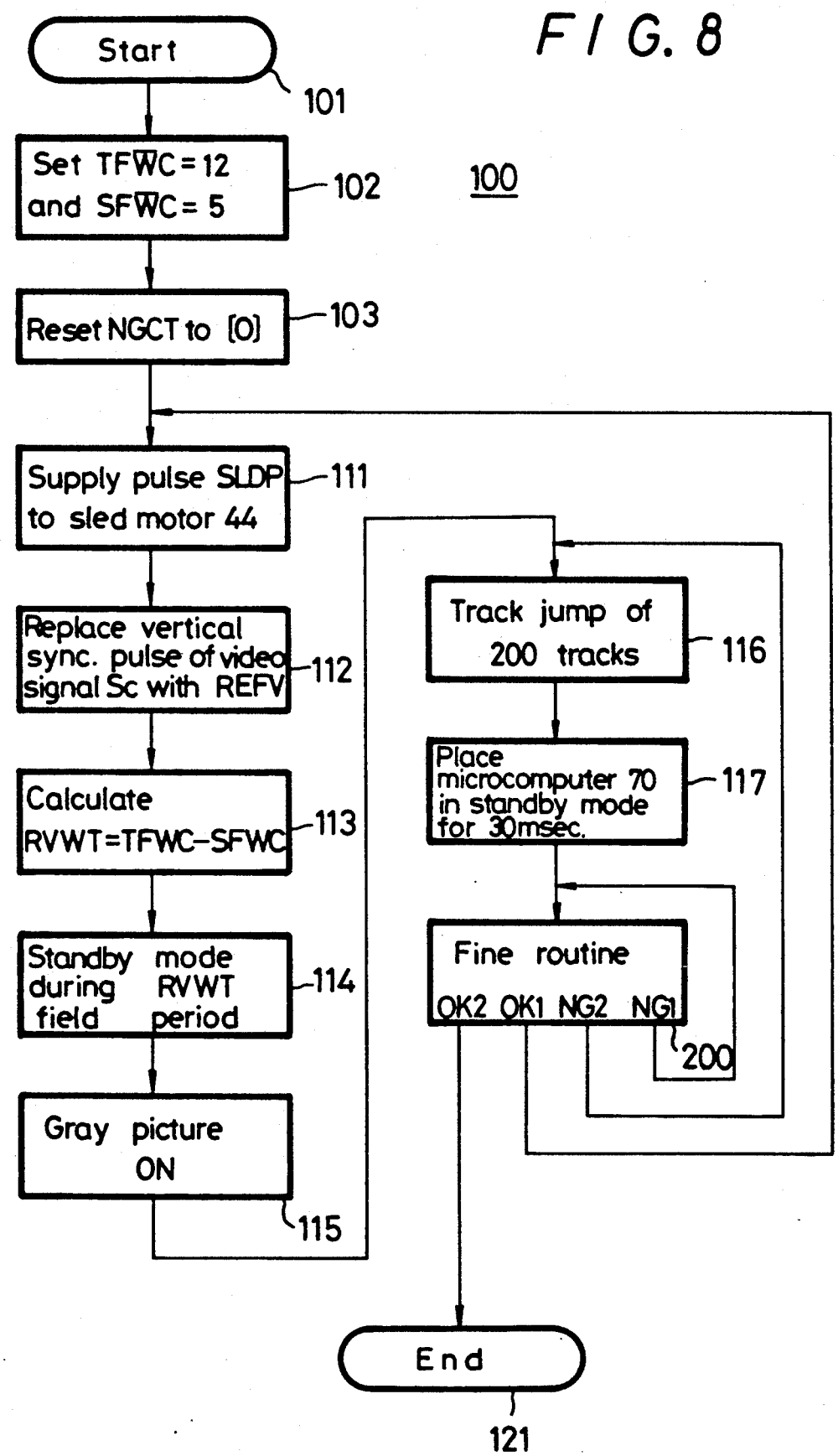

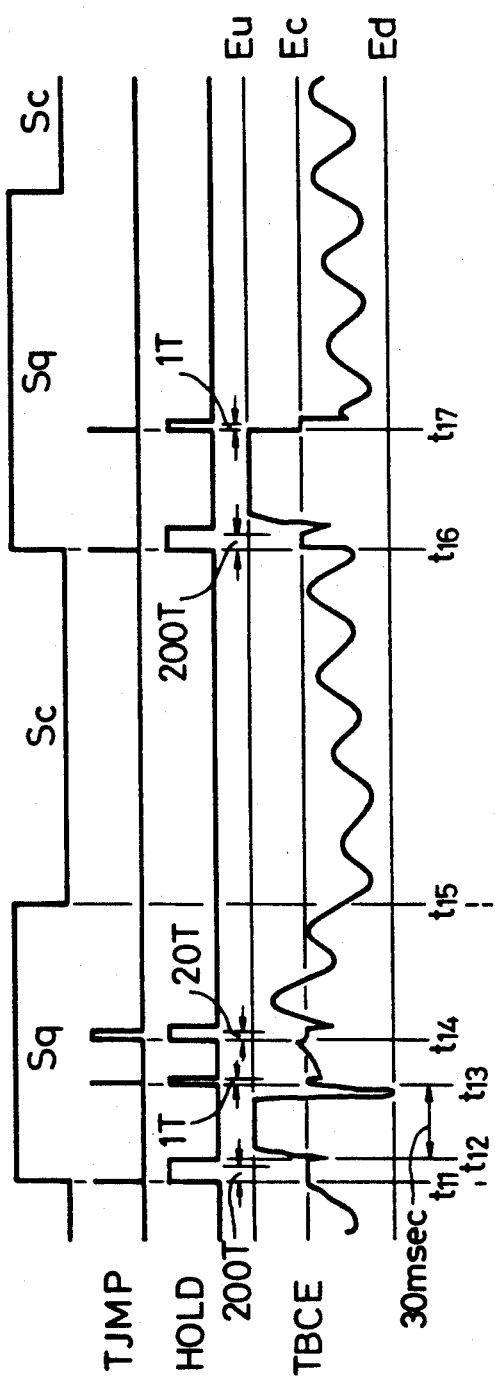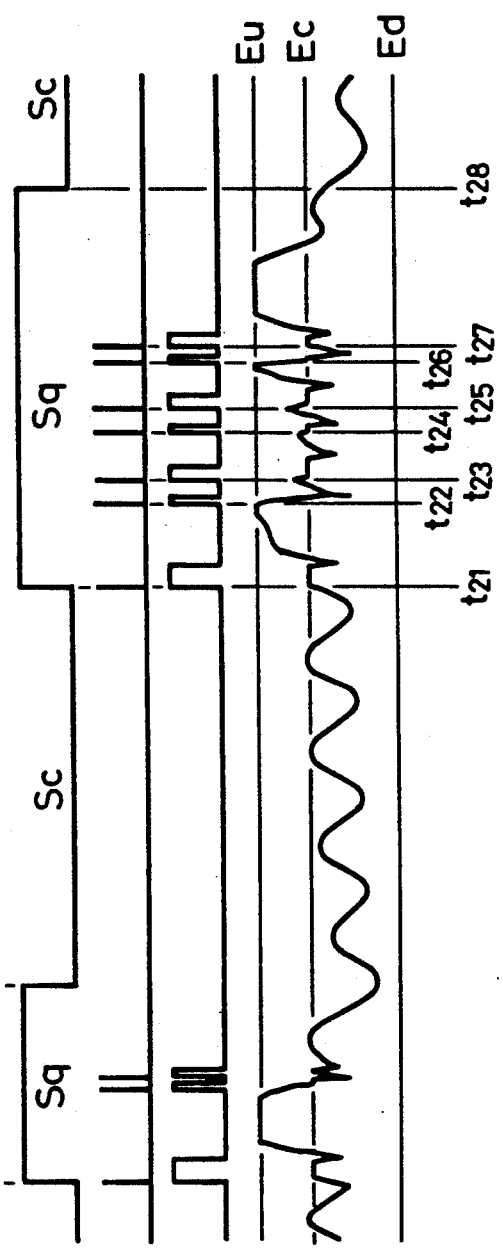

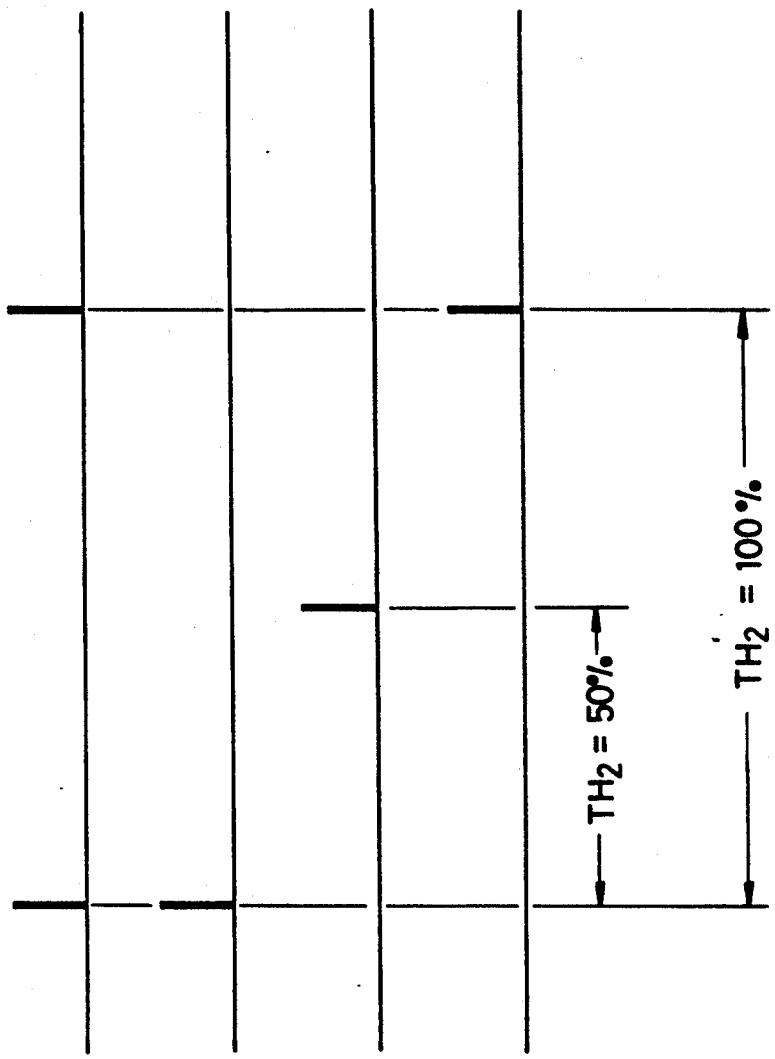

OPTICAL VIDEO DISC PLAYER

BACKGROUND OF THE INVENTION

1. Field of the Invention

The present invention relates generally to video disc players and, more particularly, is directed to a video disc player and a method for reproducing a video disc in which a video signal is reproduced in a so-called scan reproduction mode.

2. Description of the Prior Art

Initially, let us explain an example of a prior art optical video disc player with reference to FIG. 1.

Referring to FIG. 1, there is provided a microcomputer 70 which controls the whole operation of this optical video disc player. There is shown an optical type video disc 10 on which there is recorded a signal, FM-modulated by a color composite video signal in the constant linear velocity (CLV) format. The optical video disc 10 is rotated by a spindle motor 51 and is servo-controlled by a spindle servo circuit 50 so that it is rotated in a constant linear velocity fashion.

There is provided a reproducing circuit 20 which reproduces a video signal. A photo pickup head (optical head) 21 for the disc 10 includes a laser light emitting element, a light receiving element for receiving a laser light emitted from the light emitting element, an objective lens, a tracking coil for moving an optical axis of the objective lens in the radial direction of the optical disc 10 and so on, though not shown. The photo pickup head 21 is moved in the radial direction of the optical disc 10 by a sled motor 44.

There is provided a tracking servo circuit 30, wherein one portion of an output signal from the photo pickup head 21 is supplied to a detecting circuit 31 which generates a tracking error voltage Vt. This tracking error voltage Vt is supplied through an amplifier 32 to the tracking coil of the photo pickup head 21, whereby the object lens is servo-controlled in tracking.

There is provided a sled servo circuit 40, in which the tracking error voltage Vt from the detecting circuit 31 is supplied to a low-pass filter 41, from which there is derived a DC component of the tracking error voltage Vt. This DC component is supplied through a switching circuit 42 and an amplifier 43 to the sled motor 44 to servo control the sled.

Accordingly, in the normal reproducing mode, the photo pickup head 21 is servo-controlled by the tracing servo circuit 30 and the sled servo circuit 40 so that the photo pickup head 21 correctly traces the tracks on the disc 10 to thereby produce a reproduced signal.

This reproduced signal is supplied through a playback amplifier 22 and a limiter 23 to an FM demodulating circuit 24, in which it is demodulated to provide a color composite video signal Sc. The color composite video signal Sc is supplied to a time base corrector 25, in which a jitter component is removed therefrom.

More specifically, the signal Sc from the demodulating circuit 24 is supplied to a charge coupled device (CCD) 251, and the signal Sc from the CCD 251 is supplied to a synchronizing separating circuit 252, from which there is derived a horizontal synchronizing pulse PBH2. The horizontal synchronizing pulse PBH2 and a synchronizing pulse REFH are supplied to a phase comparing circuit. The synchronizing pulse REFH has a reference horizontal frequency and is derived from a master reference signal generating circuit 61. The phase comparing circuit 253 derives a phase-compared output of the pulses PBH2 and REFH which it supplies to a low-pass filter 254 which generates a time base error voltage TBCE whose level changes in response to the phase difference between the pulses PBH2 and REFH. The time base error voltage TBCE is supplied to a voltage controlled oscillator (VCO) 255 as a control signal, and an oscillation signal from the VCO 255 is supplied to the CCD 251 as a clock signal.

Accordingly, when the TBC 25 is stabilized, the pulse PBH2 becomes a signal having a constant phase synchronized with the reference pulse REFH so that the video signal Sc from the CCD 251 at that time becomes a signal whose jitter component is removed. This video signal Sc is supplied through a switching circuit 28 to an output terminal 29.

At that time, in the synchronizing separating circuit 252, a vertical synchronizing signal PBV is separated from the video signal Sc and this pulse PBV is supplied to the servo circuit 50. Simultaneously, the generating circuit 61 derives a synchronizing pulse REFV of reference vertical frequency, and this synchronizing pulse REFV is supplied to the servo circuit 50, whereby the revolution of the motor 51 is controlled in such a manner that the pulse PBV is synchronized with the pulse REFV and a first spindle servo is performed.

Further, the video signal Sc from the demodulating circuit 24 is supplied to a synchronizing separating circuit 52, which derives a horizontal synchronizing pulse PBH1. This horizontal synchronizing pulse PBH1 is supplied to the servo circuit 50 along with the pulse REFH from the generating circuit 61 whereby the revolution of the motor 51 is controlled so that the pulse PBHI is synchronized with the pulse REFH and a second spindle servo is performed.

As described above, in the normal playback mode, the spindle servo is performed such that the reproduced synchronizing pulses PBV and PBHI are synchronized with the reference synchronizing pulses REFV and REFH. The operation of the video disc player in the normal playback mode is described so far.

In the above-described video disc player, when the photo pickup head 21 is moved in the radial direction of the optical video disc 10 at a speed higher than that of the normal playback mode by the sled servo circuit 40 while the objective lens within the photo pickup head 21 is servo-controlled in tracking by the tracking servo circuit 30, the objective lens tries to stay at the original position regardless of the movement of the photo pickup head 21.

When the photo pickup head 21 is moved to the control limit of the tracking servo, the objective lens performs a so-called track jump and again starts tracking the target track next to the jumped track. In practice, the tracking servo is turned OFF, and the track jump is forcibly performed.

Accordingly, even when the photo pickup head 21 is moved at a speed higher than that of the normal playback mode, the correct video signal Sc can be obtained intermittently, whereby a reproduced picture in the fast-forward- or fast-rewind mode can be obtained by utilizing the correct video signal reproduced. In the following description, the above-mentioned operation mode will be referred to as the "scan mode" or "scan playback" mode.

In the scan playback mode, under the control of the microcomputer 70, the switching circuit 42 is changed to the opposite state to that shown FIG. 1, namely, the switching circuit 42 is connected to a fixed contact SCN, and also the signal generating circuit 61 generates a sled pulse SLDP at, for example, every 4 field periods. This sled pulse SLDP is supplied through the switching circuit 42 and the amplifier 43 to the motor 44, causing the photo pickup head 21 to be moved toward the inner peripheral or outer peripheral direction of optical video disc 10 at a speed higher than that of the normal playback mode. Further, a track jump pulse TJMP from the microcomputer 70 is supplied to the detecting circuit 31, allowing the objective lens within the photo pickup head 21 to perform the track jump.

Accordingly, till the next track jump after a track jump, the correct video signal Sc is obtained so that, similarly to the normal playback mode, the correct video signal Sc is obtained at the output terminal 29.

During the track jump, however, the correct video signal Sc is not obtained and only a noise signal is obtained so that the switching circuit 28 is connected to a fixed contact DUM by the microcomputer 70. Simultaneously, horizontal and vertical reference synchronizing pulses REFH and REFV, respectively, from the signal generating circuit 61 are supplied to a dummy signal generating circuit 62 which generates a pseudo-video signal Sq which is reproduced as, for example, a gray picture. The signal Sq is supplied through the switch circuit 28 to the output terminal 29.

Accordingly, in the scan playback mode, a reproduced picture based on the correct video signal Sc and the gray picture based on the pseudo-video signal Sq are alternately displayed, whereby the user can temporarily check a picture between the jumps in the fast-forward or fast-rewind mode.

When the scan playback is carried out as described above, the TBC 25 mal-functions. This will be described hereinafter.

As shown in the period just before time point t1 of FIGS. 2A to 2C, in the normal playback mode, the reference synchronizing pulse REFH and the reproduced synchronizing pulses PBH1 and PBH2 are substantially the same in phase. Therefore, as shown in the period just before the time point t1 of FIG. 2E, the time base error voltage TBCE slightly fluctuates up and down around a central value Ec in response to the jitter component.

If the track jump is performed from the time point t1 to a time point t2 in order to perform the scan playback, the pulses PBH1 and PBH2 become noise components during this period. In practice, the jitter component is compensated for by the CCD 251 so that the pulse PBH2 is delayed from the pulse PBH1 by a delay time of substantially one horizontal period (1H), which fact can be neglected in this description. Further, as shown in FIG. 2F, the low-pass filter 254, for example, is controlled by a control signal HOLD from the microcomputer 70, whereby the error voltage TBCE is held at a central value Ec from the time point t1.

When the track jump is ended at the time point t2 and the tracking is then stabilized, the pulses PBH1 and PBH2 are obtained at the next time point t3. However, the time point t3 at which the pulse PBH1 is obtained is random with respect to time point at which the pulse REFH is obtained so that, as shown in FIGS. 2A and 2B, they are not generally coincident with each other. If the time points of the two pulses PBHI and REFH are not coincident with each other, then the TBC 25 must compensate for the jitter component while incessantly absorbing the phase difference between the two pulses PBHI and REFH. Therefore, the TBC 25 needs a wide compensation range.

Consequently, in this example of the prior art, when the pulse PBH1 is obtained at the time point t3, the microcomputer 70 supplies a control signal HRES to the generating circuit 61 to reset the pulse REFH at the time point t3 as shown in FIG. 2D and make the pulse REFH the same in phase as that of the pulse PBH1. Accordingly, the pulse REFH is generated at each horizontal period as described hereinbefore. Further, the holding state of the TBC 25 is released from the time point t3 by the hold signal HOLD.

Therefore, it is to be appreciated that the above-mentioned correct video signal Sc is obtained from the time point t3 to the next track jump. In the scan reproduction of the CLV optical video disc, the relative velocities of the pickup head to the disc track at the track jump point and at the track after the track jump are different. In practice, the time point t3 is just behind the track jump so that the response of the spindle servo circuit 50 cannot follow the track jump. As a result, if the time point is just after a track jump, for example, in the fast-rewind mode direction, then the revolution speed of the optical video disc 10 is slower than the revolution speed needed by the track next to the jumped track and the revolution speed of the optical video disc 10 reaches the necessary revolution speed as the time passes.

Similarly, when a track jump in the fast-forward direction is performed, as shown in FIG. 2B, the cycle of the synchronizing pulse PBHI is longer than the reference value just immediately after the time point t3 and reaches a reference value as the time passes.

The TBC 25 compensates for the video signal Sc having the pulse PBHI such that the cycle of the pulse PBH2 equals the reference value from the time point t3 so that the phase relationship among the pulses PBHI, PBH2 and REFH exceeds the compensation range of the TBC 25. At the time, the error voltage TBCE is fixed to a maximum value Eu or minimum value Ed as shown in the period succeeding to a time point t4 of FIG. 2E with the result that the TBC 25 cannot carry out the correct operation. When the TBC 25 mal-functions as described above, a correct reproduced picture cannot be displayed.

When the scan reproduction is carried out as described above, if the optical video disc 10 is recorded according to the CLV format, the angular position at which the vertical synchronizing pulse PBV is recorded is slightly displaced from track to track as shown in FIG. 3 and a scan reproduced picture in which the synchronization is disturbed is obtained.

The above-mentioned phenomenon is described in our copending U.S. patent application Ser. No. 472,748, filed Jan. 31, 1990 and entitled "Video Disk Player," and will be summarized as follows.

Assuming that P is the track pitch ($=1.67 \times 10^{-6}$ (m)), R is the radius of the innermost periphery of the track ($=55 \times 10^{-3}$(m)) and N is the track number ($=1$ to 54000), then the length L of N'th track is determined as:

$$L = 2\pi(R + P(N-1)) \, (m) \qquad (i).$$

Video signals of two fields are recorded in the innermost peripheral track of the video disc according to the CLV format and one track length is fixed as $\pi R$ so that the number F of the fields involved in the N'th track is expressed by the following equation (ii)

$$F = L/(\pi R) \quad \text{(ii)}$$
$$= 2 + (2P/R)(N-1)$$
$$= 2 + k(N-1) \text{ [field]}.$$

Since $k = 2P/R \div 60.73$ (p.p.m.), $N=1$ yields $F=2$ fields, and $N=54000$ yields $F \approx 5.28$ fields.

The value k in the equation (i) represents the amount of how much the angular position at which the vertical synchronizing signal is recorded is changed when one track jump is carried out. That is, the value k indicates the amount in which the phase of the reproduced vertical synchronizing signal is changed.

A relationship between the track and the vertical synchronizing pulse Vsync in FIG. 3 will be described more fully with reference to FIGS. 4A and 4C.

FIG. 4A shows the condition near a track portion where two video fields are recorded in one track, wherein vertical synchronizing pulses Vsync are aligned substantially in the radial direction of the disc. FIG. 4B shows the condition near a track portion in which three video signals are recorded in one track, wherein although the vertical synchronizing pulses Vsync are aligned substantially in the radial direction of the disc similarly to FIG. 4A, the phase of the reproduced vertical synchronizing pulses Vsync deviates by several 10s of percents from the phase of a reference vertical synchronizing pulse of the apparatus. This is because the spindle servo is applied so that the phase of the vertical synchronizing pulse in the recorded signal deviates considerably from the phase of the reference vertical synchronizing pulse. Therefore, in the scan mode, the photo pickup head can not be pulled in a servo controllable range of $\pm 3\%$ by the servo control. If the photo pickup head is jumped into the track of this area, then a picture cannot be immediately reproduced and so, this area is referred to as a dead zone track area.

FIG. 4C illustrates the condition near a track portion where 2.7 video fields are recorded in one track. As shown in FIG. 4C, the recorded positions of the vertical synchronizing pulses fluctuate around the recorded positions of the reference vertical synchronizing pulse. If the track shifting is carried out for at least 10 or more tracks near this track position, then at least the vertical synchronizing pulse of a certain track fails within a pull-in range of the servo control.

It is to be understood from FIGS. 4A to 4C that, when a track jump is carried out near the tracks of $F=2, 3, 4$ and 5, if the number of tracks jumped is small (9 tracks in FIGS. 4A and 4C), the phase change of the vertical synchronizing pulse in the reproduced video signal after the track jump is small as compared with that occurring before the track jump. It is needless to say that, even when the track jump is carried out near the tracks of $F=2, 3, 4$, and 5, if the number of tracks jumped is selected to be very large, then the phase change of the vertical synchronizing pulse after the track jump is carried out can be made large. In this connection, the number of tracks in which 2, 3, 4 and 5 fields of the video signal are recorded in one track is expressed by the following equation $$N = 1 + \frac{R}{2P}(F+2). \quad \text{(iii)}$$

If $F=2, 3, 4$ and 5 is substituted into the above equation (iii), this yields $N=1$, $N=16468$, $N=32935$ and $N=49402$, respectively.

When a track jump is carried out near the track of $F=2.5, 3.5, 4.5, \ldots$, even if the number of tracks jumped is small, the phase of the reproduced vertical synchronizing pulse after the track jump is considerably changed as compared with the change before the track jump. In the case of FIG. 4C, the phase of the vertical synchronizing pulse is considerably changed only by a jump of one track from $N=11500$, whereby the vertical synchronizing pulse enters a region of $\pm 3\%$.

In the following description, the area in which the phase change of the vertical synchronizing pulse after the track jump is small and in which the phase of the reproduced vertical synchronizing pulse after a track jump of 10 or more tracks cannot match the phase of the reference vertical synchronizing pulse is referred to as a "dead zone track area."

Accordingly, if the dead zone track area of the video disc recorded according to the CLV format is reproduced in the conventional scan playback mode, a picture is reproduced wherein the vertical synchronization thereof is disturbed.

To avoid this defect, it is proposed that, in the scan playback mode, if the phase of the vertical synchronizing pulse contained in the reproduced video signal is continuously large (more than $\pm 3\%$) relative to the phase of the reference vertical synchronizing pulse, the above synchronizing pulse is removed and a new vertical synchronizing pulse is inserted into a position in which a time series is continued. In this proposal, however, although the vertical synchronization is not disturbed, a black band corresponding to the removed vertical synchronizing pulse appears in the reproduced picture or the upper half portion and the lower half portion of the reproduced picture are reproduced in the picture screen in a vertically reversed fashion. These conditions are represented in FIG. 5 and FIGS. 6A and 6C, respectively. FIG. 5 illustrates the vertical synchronizing pulse PBV and the reference vertical synchronizing pulse REFV of the reproduced picture, whereas FIGS. 6A and 6C illustrate the examples of the reproduced pictures monitored on a television receiver.

OBJECTS AND SUMMARY OF THE INVENTION

Therefore, it is an object of the present invention to provide an improved apparatus and method for reproducing a video disc in a scan mode and in which the above-described defects encountered with the prior art can be eliminated.

More specifically, it is an object of the present invention to provide an apparatus and method for reproducing a video disc in a scan mode in which three kinds of track jumps are carried out so that a picture is presented in which the vertical synchronization is not disturbed.

It is another object of the present invention to provide a method and apparatus for reproducing a video disc in a scan mode in which the content and screen position of the scan-reproduced picture can be known more positively.

method for high-speed scanning by carrying out track jumps during reproduction of a video signal which was recorded in a constant linear velocity format on a disc using a video disc player of the type having a photo pickup head for reproducing a video signal having a time base from the video disc, a tracking servo circuit for servo-controlling the photo pickup head in tracking, a spindle servo circuit for controlling the video disc such that the video disc rotates at a constant linear velocity, and a time base corrector for generating an error voltage and using the error voltage for correcting the time base of the reproduced video signal, the high speed scanning method comprising the steps of:

carrying out a first jump by the photo pickup head of a relatively large number of tracks of the video disc in its radial direction;

keeping in a standby mode for a predetermined time period after the first track jump by the photo pickup head which is necessary for the spindle servo to be stabilized;

carrying out a second jump by the photo pickup head after the standby mode;

holding constant the error voltage of the time base corrector during the second track jump by the photo pickup head;

generating a reference horizontal synchronizing pulse for a time base of the time base corrector and synchronizing the phase of the reference horizontal synchronizing pulse with that of a horizontal synchronizing pulse of the video signal derived from the time base corrector after the second track jump by the photo pickup head; and carrying out a third jump by the photo pickup head of one track of the video disc in its radial direction such that, after the synchronization, the phase of the vertical synchronizing pulse of the video signal from the time base corrector is synchronized with that of reference vertical pulse.

A second aspect of the present invention is a method for reproducing a constant linear velocity format recorded video signal from a video disc in a high-speed scan reproduction mode by carrying out track jumps using a video disc player of the type having a photo pickup head for reproducing a video signal having a time base from the video disc, a tracking servo circuit for servo-controlling the photo pickup head in tracking, a spindle servo circuit for controlling the linear velocity of the video disc to be constant, a time base corrector for generating an error correction signal and using the error correction signal for correcting the time base of the reproduced video signal, means for generating a reference horizontal synchronizing pulse for a time base of the time base corrector; and means for generating a reference vertical synchronizing pulse; wherein the method comprises the steps of:

carrying out a first relatively large jump by the photo pickup head of tracks of the video disc in its radial direction;

holding in a standby mode for a predetermined time period after the above-described jump by the photo pickup head to allow for the spindle servo to be stabilized;

carrying out a second jump by the photo pickup head of one track after the standby mode;

holding the error voltage of the time base corrector constant during the second jump by the photo pickup head;

synchronizing the phase of the reference horizontal synchronizing pulse with that of a horizontal synchronizing pulse of a video signal derived from the time base corrector after the second jump by the photo pickup head;

carrying out a third track jump by the photo pickup head if the phase of the vertical synchronizing pulse of the video signal from the time base corrector falls within a first allowable phase difference error range relative to the phase of the reference vertical synchronizing pulse due to a track jump by the photo pickup;

checking whether or not the difference of the phases of the vertical synchronizing pulse of the video signal and the vertical synchronizing pulse from the time base corrector fall within a second allowable phase difference error range which is larger than the first allowable phase difference error range if the phase of the vertical synchronizing pulse does not fall within the first allowable phase difference error range; and carrying out a fourth track jump by the photo pickup head instead of the third track jump by the photo pickup head if the phase of the vertical synchronizing pulse falls within the second allowable phase difference error range.

In a third aspect of the present invention, in a method for reproducing a constant linear velocity format recorded video signal from a video disc in a high-speed scan reproduction mode by carrying out track jumps using a video disc player of the type having a photo pickup head for reproducing a video signal from the video disc, a tracking servo circuit for servo-controlling the photo pickup head in tracking, a spindle servo circuit for controlling the linear velocity of the video disc to be constant, a time base corrector for generating an error correction signal and, by means of the error correction signal, correcting a time base of the video signal reproduced, means for generating a reference horizontal synchronizing pulse for a time base of the time base corrector; and means for generating a reference vertical synchronizing pulse; wherein the method comprises the steps of:

carrying out a first jump by the photo pickup head of a relatively large number of tracks of the video disc in its radial direction;

keeping the video disc player in a standby mode for a predetermined time period after the first track jump by the photo pickup head;

carrying out a second jump by the photo pickup head of a small number of tracks after the standby mode;

holding the error voltage of the time base corrector constant during the second track jump by the photo pickup head;

synchronizing the phase of the reference horizontal synchronizing pulse of the time base of the time base corrector with that of the horizontal synchronizing pulse of a video signal derived from the time base corrector after the second track jump by the photo pickup head;

carrying out a third jump by the photo pickup head if a phase of the vertical synchronizing pulse of the video signal from the time base corrector falls within a predetermined allowable phase difference error range relative to the reference vertical synchronizing pulse by the third track jump by the photo pickup head after the synchronization; and changing the frequency of the reference vertical synchronizing pulse by a predetermined frequency so that the reference vertical pulse is phase-locked to the vertical synchronizing pulse if the phase difference of the video signal vertical synchronizing pulse and the reference vertical synchronizing pulse does not fall within the predetermined allowable phase difference range.

In a fourth aspect of the present invention, a video disc player for reproducing a video disc recorded according to a constant linear velocity format, the video disc player comprising:
- a photo pickup head for reproducing a video signal from the video disc;
- a tracking servo circuit for servo-controlling the photo pickup head in tracking;
- a spindle servo circuit for controlling the linear velocity of the video disc to be constant;
- a time base corrector for generating an error correction signal and, by means of the error correction signal, correcting a time base of the video signal reproduced;
- means for generating a reference horizontal synchronizing pulse for the time base of the time base corrector; and
- means for generating a reference vertical synchronizing pulse; and
- scan reproduction means for reproducing the recorded video signals from the disc at high speed by carrying out track jumps and including:
  - a circuit for carrying out a first jump by the photo pickup head of a relatively large number of tracks in the radial direction of the video disc;
  - a circuit for causing the scan reproduction means to carry out a standby mode for a predetermined time period after the first track jump by the photo pickup head;
  - a circuit for carrying out a second jump by the photo pickup head of one track after the standby mode;
  - a circuit for holding constant the error voltage of the time base corrector during the second track jump;
  - a circuit for synchronizing the phase of the reference horizontal synchronizing pulse with that of a horizontal synchronizing phase of a video signal derived from the time base corrector after the second jump by the photo pickup head; and
  - a circuit for carrying out a third jump by the photo pickup head of one track of the video disc in its radial direction such that, after the synchronization, the phase of the vertical synchronizing phase of the video signal from the time base corrector is synchronized with that of reference vertical pulse.

These, and other objects, features and advantages of the preferred embodiment, will be apparent in the following detailed description of the invention when read in conjunction with the accompanying drawings, in which like reference numerals are used to identify the same or similar parts in the several views.

BRIEF DESCRIPTION OF THE DRAWINGS

FIG. 5 is schematic diagram showing a vertical synchronizing pulse of a reproduced signal and a reference vertical synchronizing pulse, and to which reference will be made in explaining the prior art;

FIGS. 6A to 6C are schematic diagrams of pictures reproduced on a picture screen of a television monitor receiver, and to which reference will be made in explaining the defects inherent in the prior art;

FIG. 8 is a flow chart to which reference will be made in explaining an operation of a scan reproduction mode according to the present invention;

FIGS. 9A to 9D and FIGS. 10A to 10D are waveform diagrams to which reference will be made in explaining an operationof the present invention;

FIGS. 12A to 12D are schematic diagrams to which reference will be made in explaining the present invention.

DETAILED DESCRIPTION OF A PREFERRED EMBODIMENT

The present invention will now be described with reference to the drawings.

Figure 1:
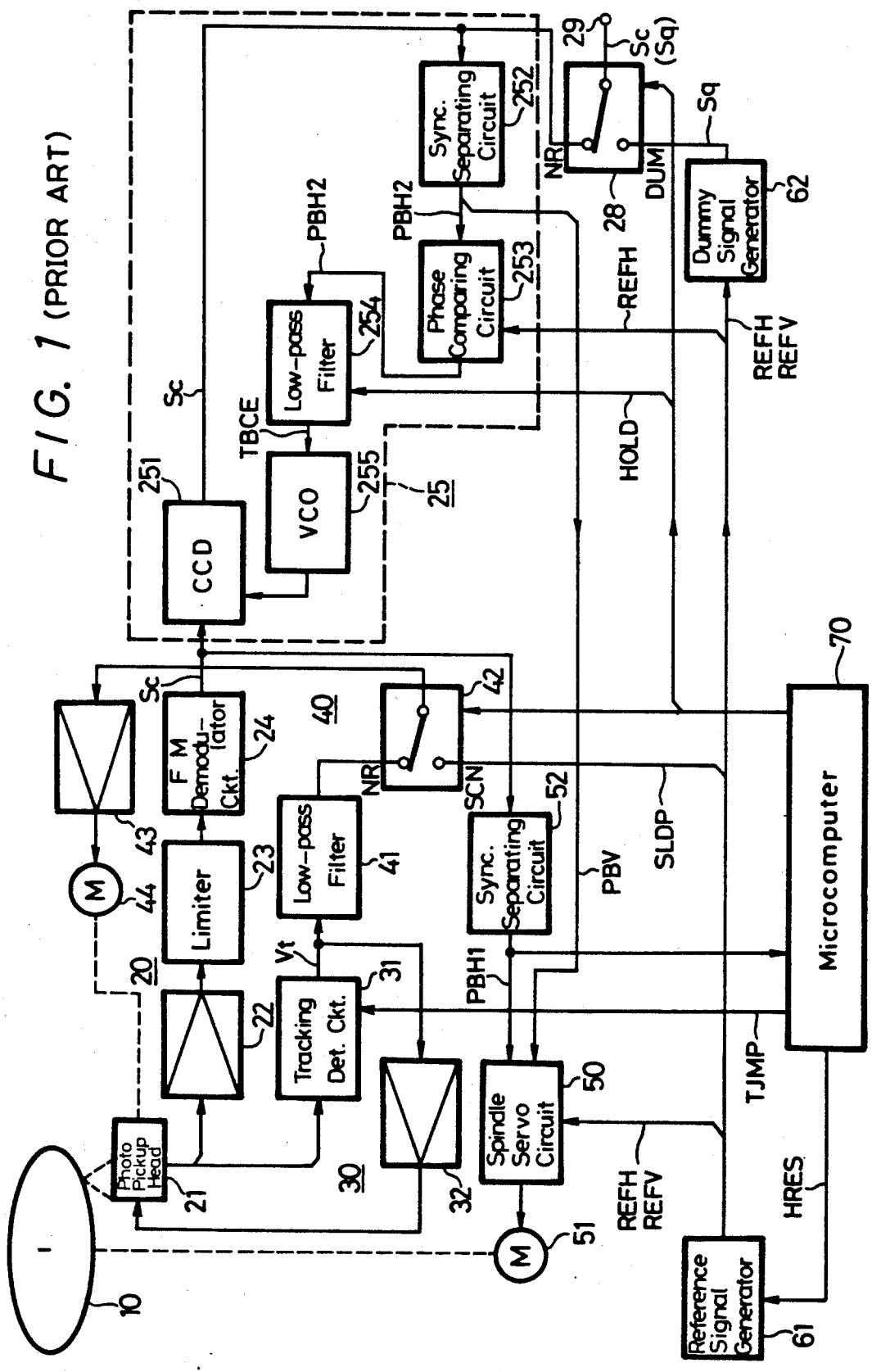
FIG. 1 is a block diagram showing an example of a prior art optical video disc player.
Figure 2:
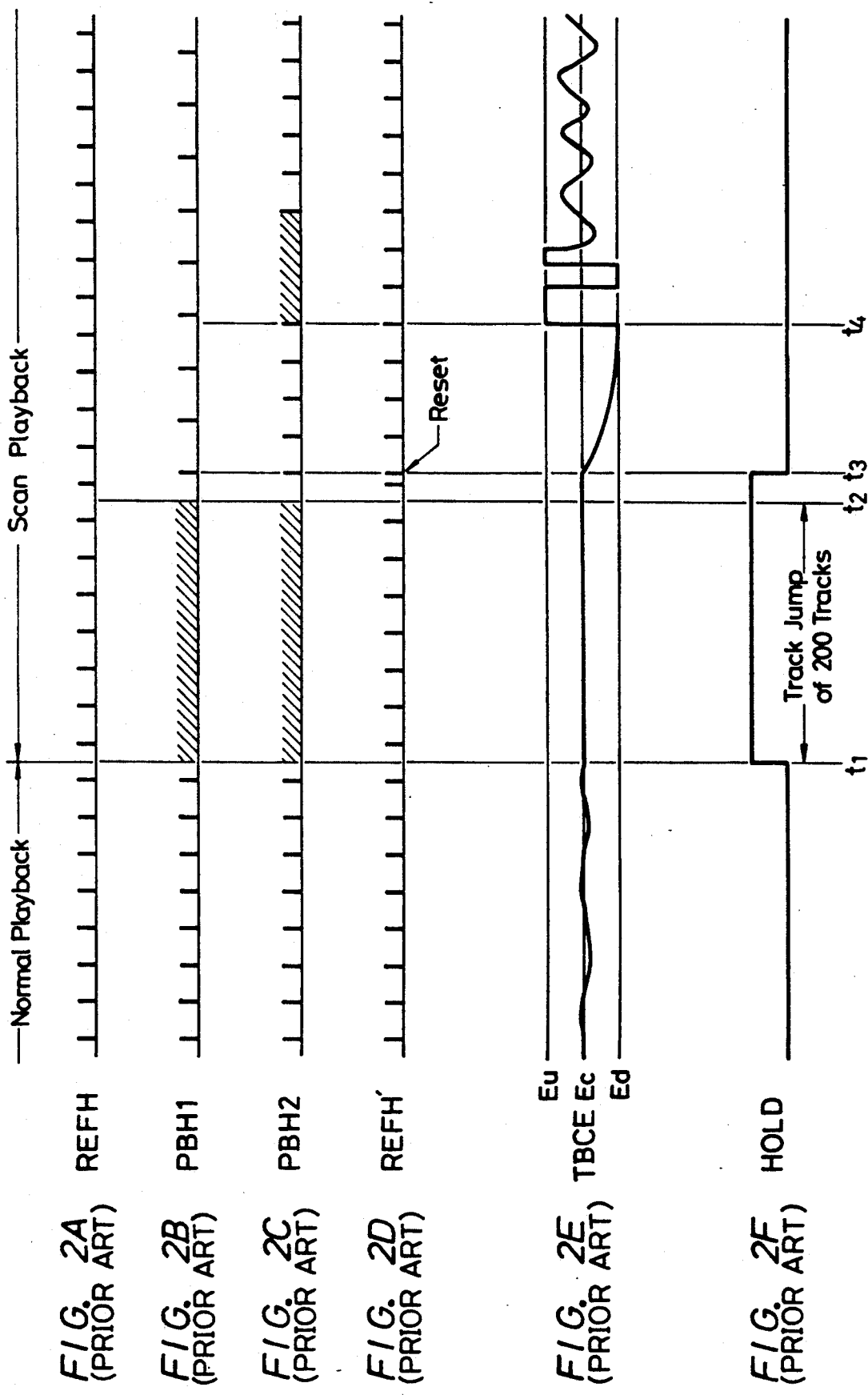
FIGS. 2A to 2F are timing charts to which reference will be made in explaining a prior art normal reproduction and a scan reproduction, respectively.
Figure 3:
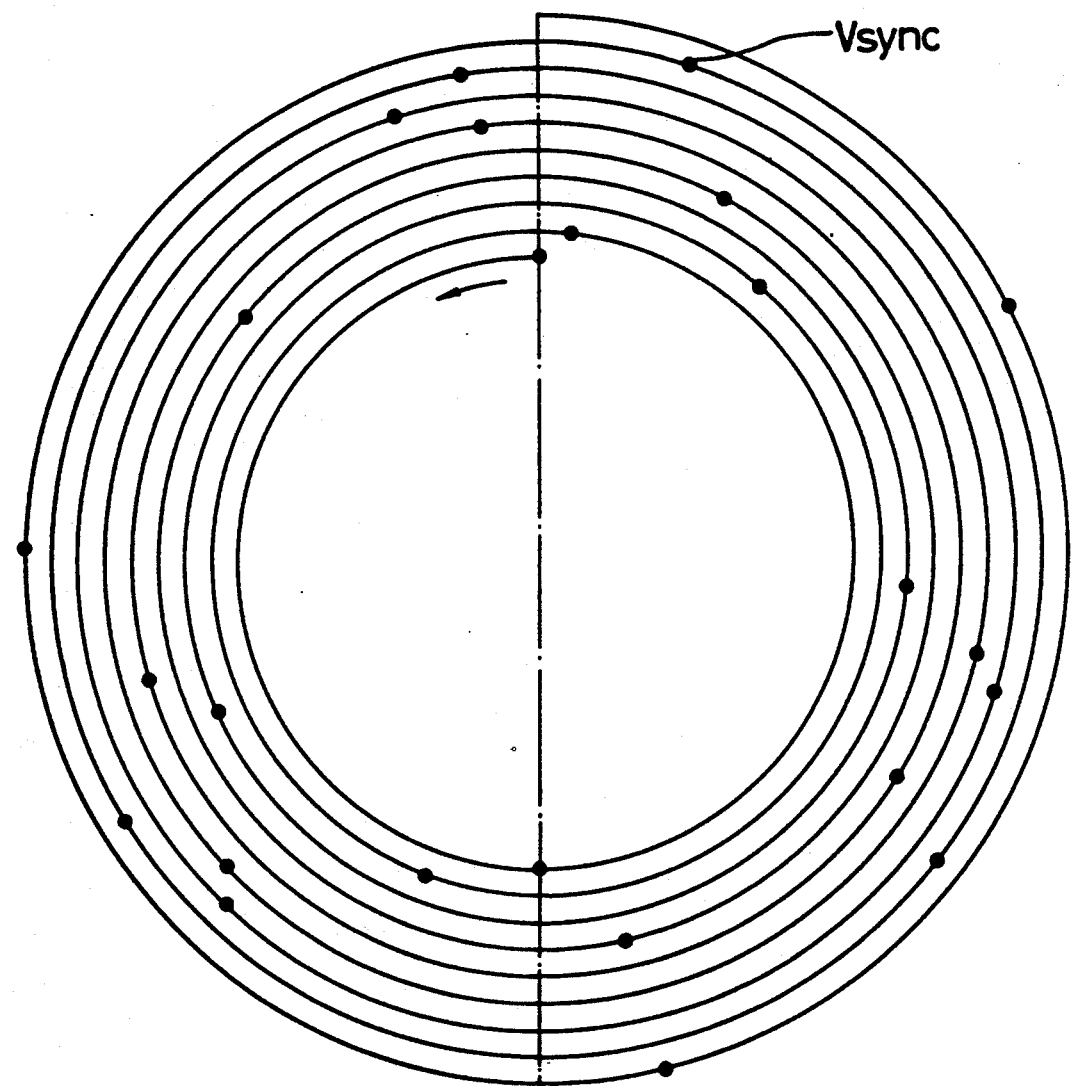
FIG. 3 is a schematic planar view illustrating an example of a constant linear velocity (CLV) format video disc according to the prior art.
Figure 4A:
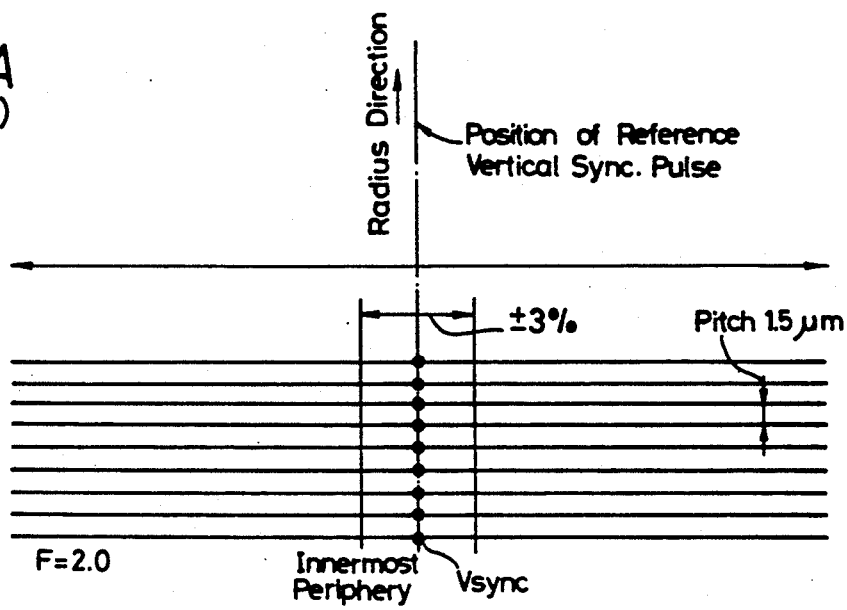
FIG. 4A to 4C are fragmentary, enlarged views of tracks on a prior art video disc, and to which reference will be made in explaining the relationship between a track and a vertical synchronizing pulse, respectively.
Figure 4B:
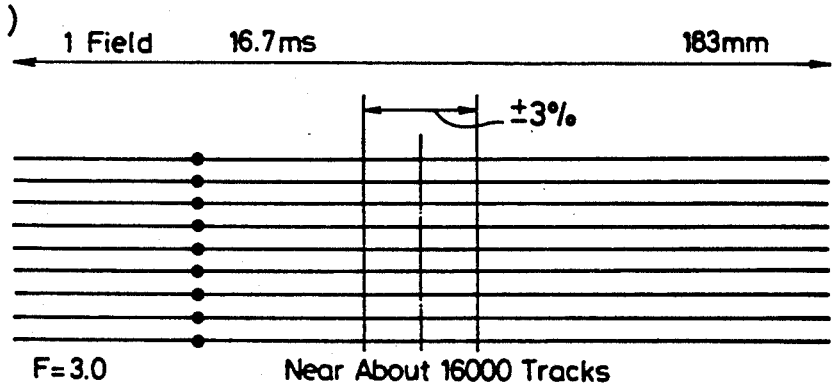
Figure 4C:
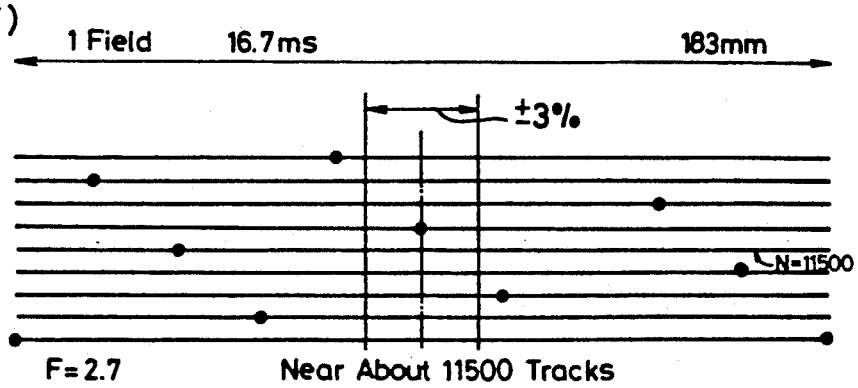
Figure 7:
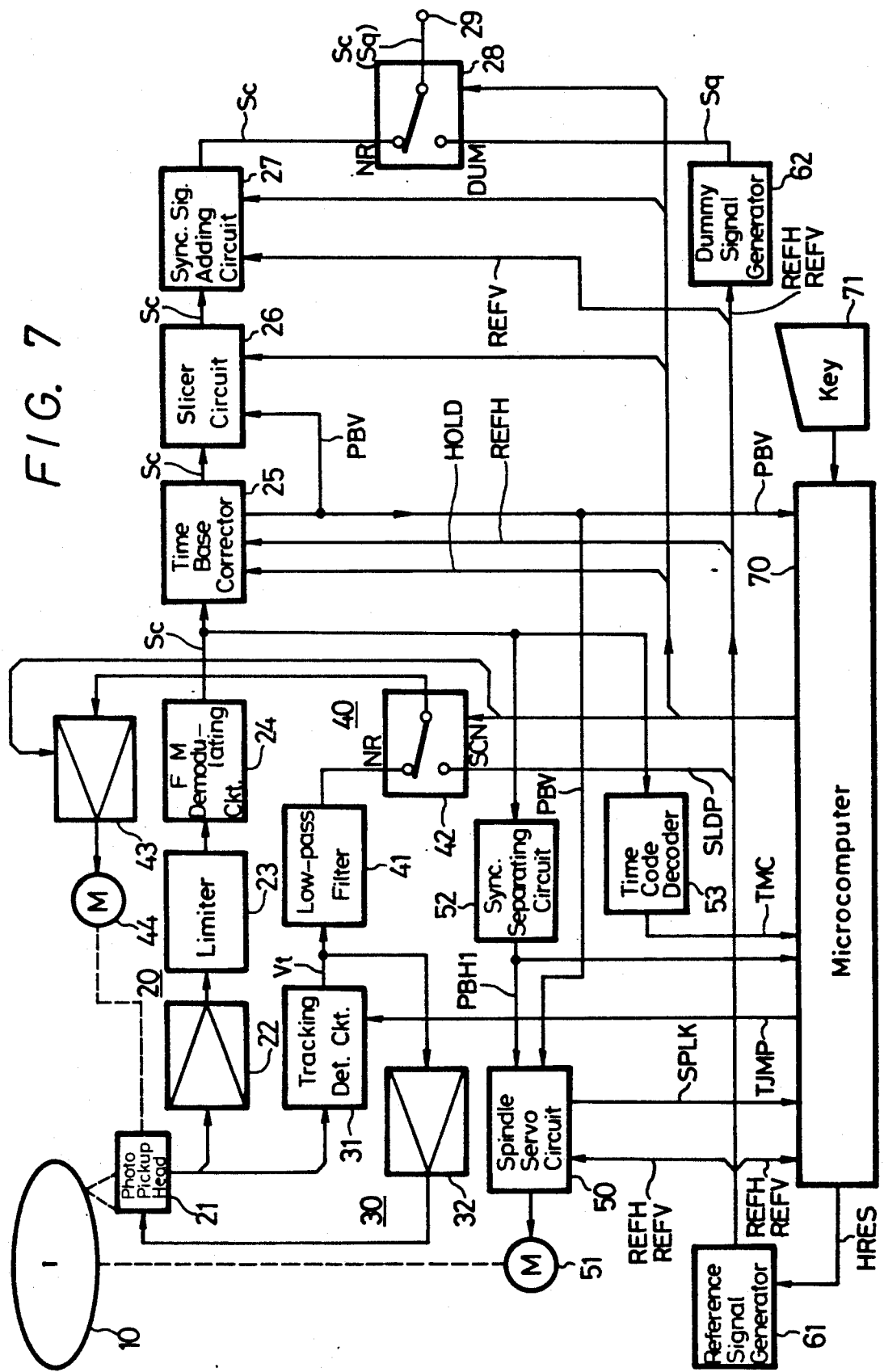
FIG. 7 is a block diagram showing an embodiment of a video disc payer according to the present invention.

Referring to FIG. 7 in which like parts corresponding to those in FIG. 1 are marked with the same references and therefore need not be described in detail, there is provided a slicer circuit 26. The slicer circuit 26 responds to a command signal issued from the microcomputer 70 to remove the vertical synchronizing pulse PBV from the video signal Sc of the TBC 25 on the basis of the reproduced vertical synchronizing pulse PBV derived from the synchronizing separating circuit 252 in the TBC 25 so that the pedestal level of the output video signal is changed, for example, to a black level.

There is provided a synchronizing signal adding circuit 27. When supplied with a command signal from the microcomputer 70, the synchronizing signal adding circuit 27 adds the reference vertical synchronizing pulse REFV to the video signal Sc from the slicer circuit 26.

Further, the reproduced vertical synchronizing pulse PBV from the TBC 25 is supplied to the microcomputer 70, and the servo circuit 50 derives a signal SPLK which indicates the locked condition of the spindle servo. This signal SPLK is supplied to the microcomputer 70. The video signal Sc is supplied to a decoder 53, from which there is derived a time code TMC. This time code TMC is supplied to the microcomputer 70.

The microcomputer 70 is provided with a routine 100 which is represented, for example, in FIG. 8. In the scan reproduction mode, this routine 100 of FIG. 8 is executed by the microcomputer 70.

In order to gain a better understanding of the routine 100, let us first explain an outline of the operation in the scan playback mode with reference to waveform diagrams of FIGS. 9A to 9D and FIGS. 10A to 10D.

FIGS. 9A to 9D illustrate the case where a scan reproduction in the fast rewind direction is carried out on a track about one minute after the reproduction of the innermost peripheral track is started. More specifically, as shown in FIG. 9A, the pseudo video signal Sq is generated by the microcomputer 70 at a time t11, whereby the reproduced picture is muted and becomes gray. Also, as shown in FIG. 9B, a track jump pulse TJMP is the time point t11 to thereby carry out a track jump of, for example, 200 tracks.

Further, as shown in FIG. 9C, the hold signal HOLD from the microcomputer 70 goes to high "H" in level during a period of from t11 to t12, whereas as shown in FIG. 9D, the error voltage TBCE of the TBC circuit 25 is held at the central value Ec during a period of from t11 to t12. At the time point t12, the horizontal synchronization reference pulse REFH from the reference signal generator 61 is reset by the signal HRES from the microcomputer 70 so that the phase thereof is made the same as that of the reproduced pulse PBH2.

Until the spindle servo circuit 50 is stabilized, the microcomputer 70 is placed in the standby mode during a period of 30 milliseconds from the time point t12 to t13, and at the time point t13, a track jump of one track is carried out on the basis of the track jump pulse TJMP from the microcomputer 70. Also in this track jump of one track, the error voltage TBCE of the TBC circuit 25 is held and the reference pulse REFH is reset. Owing to the holding and resetting, the TBC circuit 25 is stabilized.

Subsequently, an additional or fine track jump is performed on the basis of the track jump pulse TJMP at a time point t14. The number of tracks jumped by this fine track jump falls within a range of 0 to 20 tracks, and by this fine track jump, the reproduced synchronizing pulse PBV is synchronized with the reference synchronizing pulse REFV. The muting of the reproduced picture by the pseudo video signal Sq is released at a time point t15 and hence, the reproduced video signal Sc is produced.

At a time point t16, the operations after the time point t11 are repeated. In the case of FIGS. 9A to 9D, a track jump of 200 tracks and a track jump of one track are carried out at time points t16 and t17, respectively, but the fine track jump is not carried out.

FIGS. 10A to 10D illustrate a case in which a scan reproduction in the fast rewind mode is performed on the track about three minutes after the reproduction of the innermost peripheral track is started. In the first half portion (in the left-handed side portion) of FIG. 10, a track jump is carried out similarly to FIGS. 9A and 9D, whereas in the second half portion, when a track jump of 200 tracks is performed at a time point t21, the photo pickup head 21 enters the dead zone so that track jumps of one track at time points t22, t24 and t26 and fine track jumps at time points t23, t25 and t27 are alternately carried out. At the time point t28, the video signal Sc is fed to the output terminal 29. The above-described track jump process is the same as that described in our above-identified co-pending U.S. patent application.

The operation of the whole system disc of this video disc player of the invention will now be described with reference to a flow chart of FIG. 8.

As shown in FIG. 8, when a scan reproduction fast forward or fast rewind key 71 (see FIG. 7) is depressed, the processing of the microcomputer 70 begins with step 101 in the routine 100. In the next step 102, counters TFWC and SFWC in the software are set, for example, as $$TFWC = 12, SFWC = 5$$

In that case, the initial value of the counter TFWC corresponds with the field period number from a certain track jump to the next track jump, whereas the initial value of the counter SFWC corresponds with the field period number wherein the pseudo video signal Sq is fed to the output terminal 29 in one track jump. The values, however, are standard values and these values are not necessarily satisfied on the picture screen.

Then, the processing of the microcomputer 70 proceeds to step 103. In step 103, a dead zone decision counter NGCT made by the software is reset to [0]. In the next step 111, the switching circuit 42 is connected to the fixed contact SCN to permit the pulse SLDP to be fed to the sled motor 44 to start the scan.

The processing of the microcomputer 70 proceeds to step 112 where the vertical synchronizing pulse PBV is removed by the slicer circuit 26 and the vertical synchronizing pulse REFV is added by the adding circuit 27 so that thereafter the vertical synchronizing pulse of the video signal Sc is taken as the pulse REFV. At that time point, in the normal reproduction mode, since the spindle servo is carried out such that the reproduced vertical pulse PBV is synchronized with the reference vertical pulse REFV, the pulse REFV added to the output video signal Sc is located at the time position of the original pulse PBV.

Then, the processing of the microcomputer 70 proceeds to step 113, and in step 113, a value RVWT is calculated as $$RVWT = TFWC - SFWC$$

In that case, the counter TFWC corresponds with the field period number for a certain track jump to the next track jump, whereas the counter SFWC corresponds with the field period number wherein the pseudo video signal Sq is generated in one track jump. Therefore, the value RVWT corresponds with the field period number of the video signal Sc normally reproduced at every track jump.

In the next step 114, the reference vertical synchronizing pulse REFV is counted by the number of the value RVWT calculated in step 113. That is, the microcomputer 70 is placed in a standby mode during the RVWT field period. Accordingly, in step 114, during the RVWT field period, the normal video signal Sc is fed to the output terminal 29.

The processing of the microcomputer 70 proceeds to step 115 where the switching circuit 28 is connected to the fixed contact DUM so that the pseudo video signal Sq is fed to the output terminal 29 from the time point of the step 115. In the normal reproducing mode, and in steps 114 and 115, the reference synchronizing pulse REFV is employed as the standard of the vertical synchronization, whereby the vertical synchronization on the picture screen can be prevented from being disturbed throughout the above-mentioned processings.

In the next step 116, a track jump of, for example, 200 tracks is performed on the basis of the pulse. TJMP delivered from the microcomputer 70 to the tracking detector circuit 31. During this track jump, the error voltage TBCE of the TBC 25 is held at the central value Ec and the pulse REFH is reset by the signal HRES supplied from the microcomputer 70 after the track jump so that the reference pulse has the same phase as that of the reproduced pulse PBH2.

In the next step 117, during a period in which the synchronization disturbance produced in the spindle servo circuit 50 by the track jump in step 116 is stabilized, the microcomputer 70 is placed in a standby mode during a period of, for example, 30 milliseconds and the processing of the microcomputer 70 proceeds to an additional or fine routine 200.

Although the fine routine 200 will be described more fully later, the video signal Sc becomes synchronized with the reference synchronizing pulse REFV. Simultaneously, if the scan playback key 71 is depressed, the switching circuit 28 is connected to the fixed contract NR to thereby allow the video signal Sc to be supplied to the output terminal 29. Then, the processing of the microcomputer 70 returns to step 111 via a line OK1. Accordingly, in that case, the scan playback is continued.

In the routine 200, the video signal Sc is synchronized with the reference synchronizing pulse REFV. If the scan playback key is released, the switching circuit 28 is connected to the fixed contact NR to permit the above-described video signal Sc to be fed to the output terminal 29. Also, the removal of the pulse PVB in the slicer circuit 26 and the addition of the pulse REFV in the adding circuit 27 are inhibited and then the processing of the microcomputer 70 proceeds to step 121 via a line OK2 to end the routine 100. Accordingly, in that case, the scan playback is ended and the video disc player is set in the normal playback mode.

Further, in step 200, when the photo pickup head 21 in the scan reproduction mode enters the dead zone, the processing of the microcomputer 70 stays at the routine 200 via a line NG1. Further, in the routine 200, when the locking of the spindle servo circuit 50 is extraordinarily slow, the processing of the microcomputer 70 returns to step 116 through a line NG2.

Figure 11A:
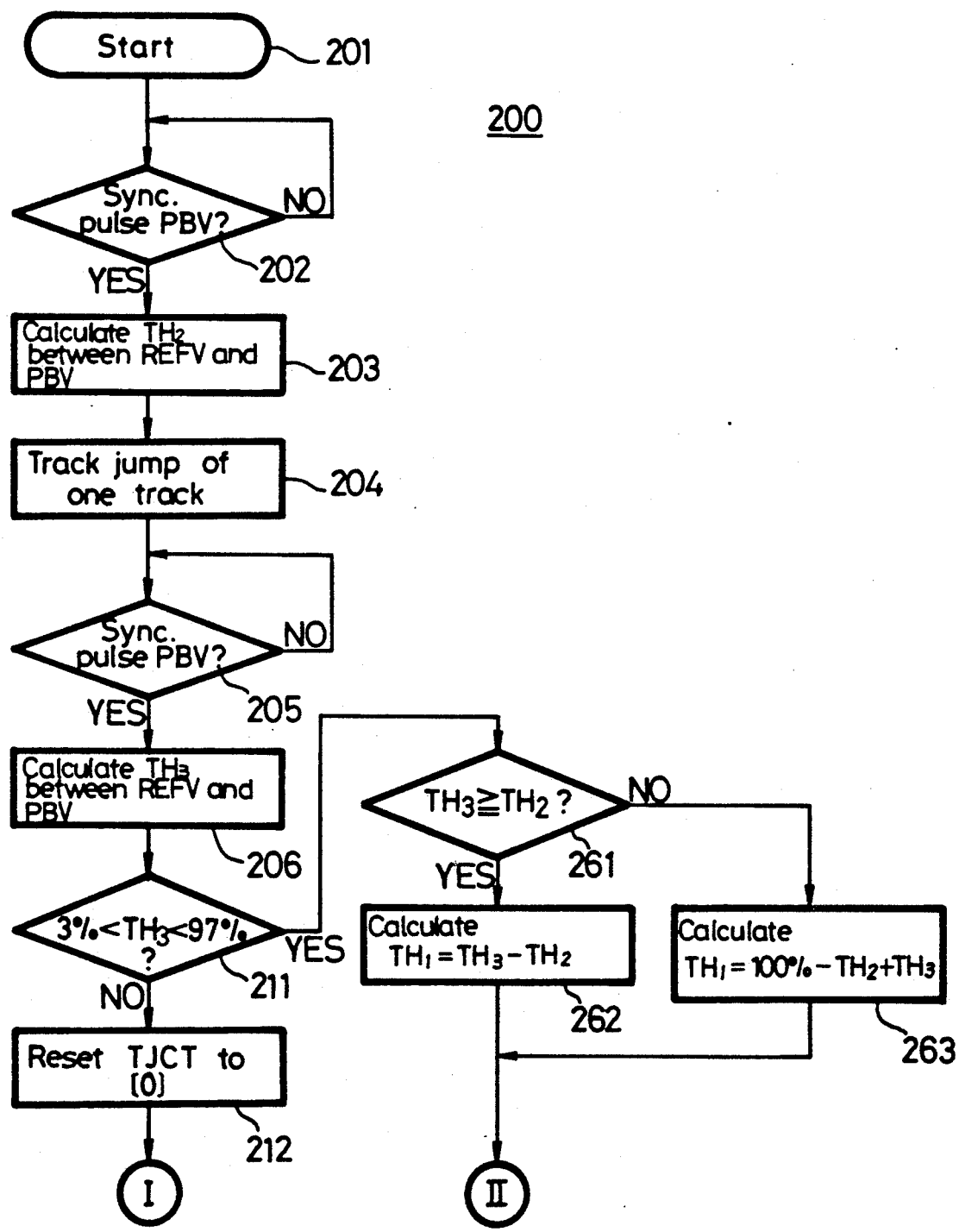
FIGS. 11A to 11C are flow charts to which reference will be made in explaining the operation of a so-called fine routine.
Figure 11B:
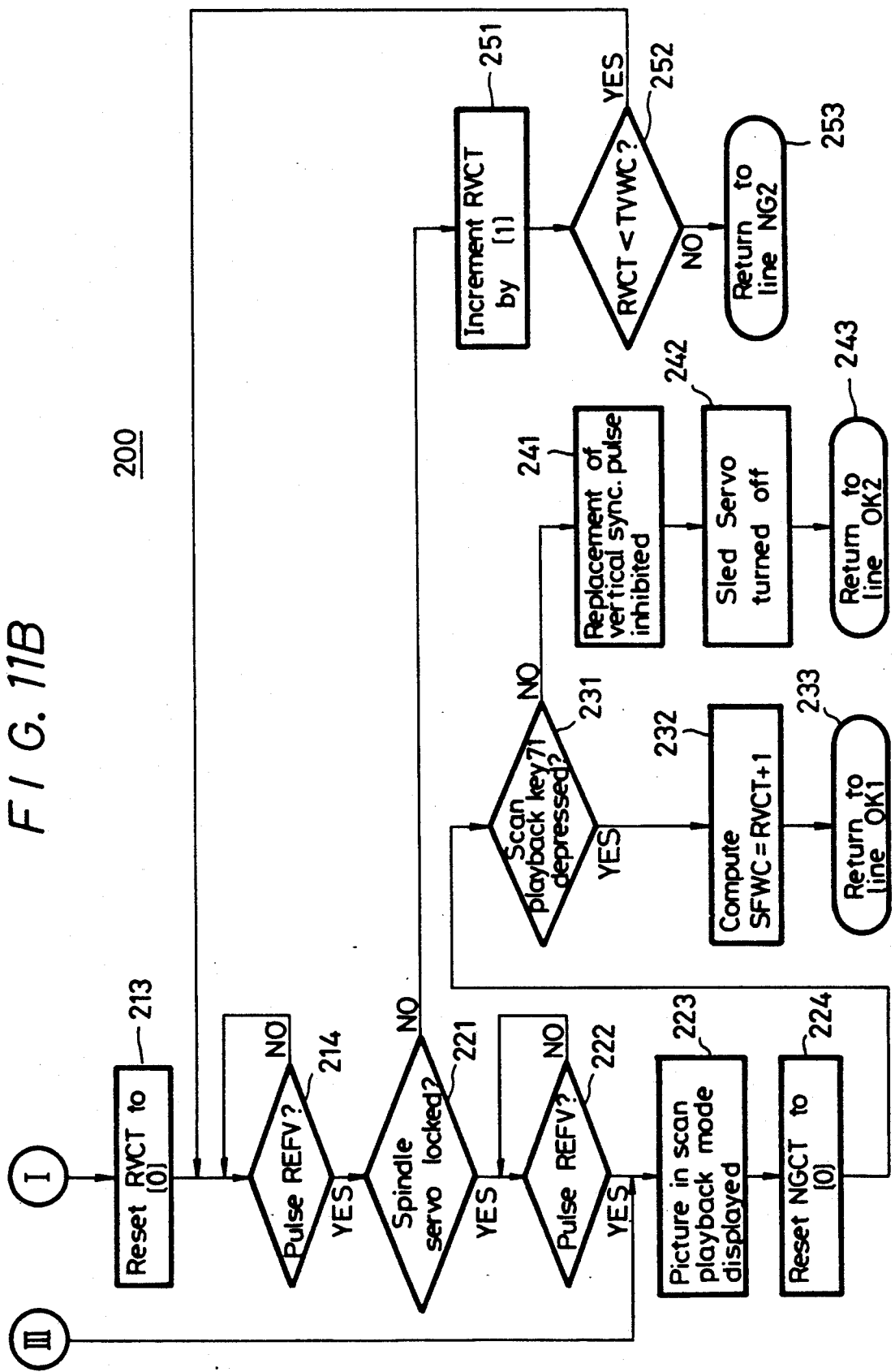

In actual practice, the routine 200 is constructed and executed as shown in FIGS. 11A and 11B. The routine 200 begins with step 201, and in the next decision step 202, it is determined whether or not the reproduced synchronizing pulse PBV exists. The step 202 is repeated until the reproduced synchronizing pulse PBV is obtained. After the reproduced synchronizing pulse PBV is obtained, the processing of the microcomputer 70 proceeds to the next step 203. In step 203, a phase difference $TH_2$ between the reference vertical pulse REFV and the reproduced vertical pulse PBV is calculated. In that case, when the phase of the target pulse PBV is the same as that of the pulse REFV, as shown in FIGS. 12A and 12B, the phase difference $TH_2$ is equal to 0%. When the target pulse PBV is advanced from the pulse REFV by 0.5 field as shown in FIGS. 12A and 12C, the phase difference $TH_2$ is equal to 50%. When the target pulse PBV is advanced from the pulse REFV by one field as shown in FIGS. 12A and 12D, the phase difference $TH_2$ is equal to 100%. This relationship applies for other phase differences as well.

Then, the processing of the microcomputer 70 proceeds to step 204 where a track jump of one track is carried out on the basis of the pulse TJMP. During this track jump, the error voltage TBCE is held by the signal HOLD, and at the completion of the track jump, the phase of the reference horizontal synchronizing pulse REFH is reset to that of the reproduced pulse PBH2 by the reset command signal HRES from the microcomputer 70 to the reference signal generator 61.

The processing of the microcomputer 70 proceeds to the next decision step 205. It is again determined in step 205 whether or not the reproduced pulse PBV exists. The step 205 is repeated until the next reproduced pulse PBV is obtained. When the pulse PBV is obtained as represented by a YES, the processing of the microcomputer 70 proceeds to the next step 206. In step 206, a phase difference $TH_3$ between the pulse REFV and the pulse PBV is calculated. In the next decision step 211, it is determined whether, for example, the following equation (i) is satisfied or not.

$$3\% < TH_3 < 97\% \qquad (i)$$

If the condition (i) is not satisfied at step 211, or if the phase difference $TH_3$ falls within ±3%, the processing of the microcomputer 70 proceeds from step 211 to step 212. In step 212, a track jump counter TJCT in the software is reset to "0".

As shown in FIG. 11B, the processing of the microcomputer 70 proceeds from step 212 to step 213 where the reference vertical synchronizing counter RVCT made by the software is reset to "0", and the processing of the microcomputer 70 proceeds to the next decision step 214. It is determined in decision step 214 whether or not the pulse REFV exists. The interrogation in step 214 is repeated until the pulse REFV is obtained. If it is determined that the pulse REFV exists as represented by a YES at step 214, then the processing of the microcomputer 70 proceeds to decision step 221 where it is determined whether or not the spindle servo is locked by the signal SPLK.

If the spindle servo is locked as represented by a YES at step 221, then the processing of the microcomputer 70 proceeds from step 221 to the next decision step 222 where it is again determined whether or not the pulse REFV exists. The interrogation in step 222 is repeated until the pulse REFV is obtained. If the pulse REFV is obtained as represented by a YES at step 222, then the processing of the microcomputer 70 proceeds from step 222 to step 223. In step 223, the switching circuit 28 is connected to the fixed contact NR. Therefore, from the time point of this step 223, the signal Sc, scan-reproduced, is fed to the output terminal 29, whereby a picture in the scan playback mode is displayed.

The processing of the microcomputer 70 proceeds to step 224, whereat the counter NGCT is reset to "0". Further, the processing of the microcomputer 70 proceeds to the next decision step 231 where it is determined whether or not the scan playback key 71 is depressed. If so, as represented by a YES at step 231, then the processing of the microcomputer 70 proceeds from step 231 to step 232. In step 232, an equation of SFWC=RVCT+1 is computed, and the routine 200 ends with the next step 233 and the processing of the microcomputer 70 returns to the line OK1.

Accordingly, when the scan playback key 71 is depressed, the above-described processings are repeated so long as the phase difference $TH_3$ between the reproduced vertical synchronizing pulse PBV and the target pulse PBV falls within ±3%.

More specifically, after a track jump of 200 tracks is carried out at step 117, a track jump of one track is carried out at step 204. Further, during the track jumps, the pseudo video signal Sq is generated to mute the display screen, and during the period between a certain track jump and the next track jump, the reproduced video signal Sc is generated over the RVWT field period in which the normal reproduction is made possible at step 114. In this way the scan playback is performed.

When the adding circuit 27 derives the reproduced video signal Sc, the phase difference $TH_3$ between the reference vertical synchronizing pulse REFV and the vertical synchronizing pulse PBV of the signal Sc falls within ±3% (in this case, however, the vertical pulse PBV of the signal Sc is removed at step 112 and the pulse REFV is added), and synchronization can be prevented from being disturbed.

Further, at every track jump, the error voltage TBCE of the TBC circuit 25 is held at the central value Ec and the reproduced horizontal synchronizing pulse REFH is reset so that the TBC 25 is operated correctly during the period in which the signal Sc is reproduced.

If it is determined that the scan playback key 71 is released or is not depressed as represented by a NO at step 231, then the processing of the microcomputer 70 proceeds from step 231 to step 241. In step 241, the removal of the vertical synchronizing pulse PBV of the video signal Sc and the addition of the vertical synchronizing pulse REFV by the slicer circuit 26 and the adding circuit 27 are inhibited. Then, the processing of the microcomputer 70 proceeds to the next step 242, whereat the switching circuit 42 is connected to the fixed contact NR to interrupt the high speed movement of the photo pickup head 21 and to effect the normal sled servo. Thereafter, the routine 200 ends with the next step 243, and the processing of the microcomputer 70 returns to the line OK2. Accordingly, if the depression of the scan playback key 71 is released in the scan playback mode, the scan playback is ended.

Further, if it is determined that the spindle servo of the spindle servo circuit 50 is not locked, as represented by a NO at step 221, then the processing of the microcomputer 70 proceeds from step 221 to step 251. In step 251, the counter RVCT is incremented by [1] and the processing of the microcomputer 70 proceeds to the next decision step 252 where it is determined whether or not the condition of RVCT<TFWC is established. If RVCT<TFWC, the processing of the microcomputer 70 returns from step 252 to step 214. Therefore, the counter RVCT is incremented at every reference pulse REFV and for so long as the condition of RVCT<TFWC is established, the steps 214, 221, 251 and 252 are repeated to until the spindle servo of the spindle servo circuit 50 is locked. If the spindle servo is locked, the processing of the microcomputer 70 proceeds from step 221 to step 222 and the processing of the microcomputer 70 proceeds to step 233 or 243.

However, if RVCT<TFWC is no longer true or if the locking of the spindle servo is too slow, then the processing of the microcomputer 70 proceeds from step 252 to step 253 whereat the routine 200 is ended and the processing of the microcomputer 70 returns to step 116 via the line NG2.

Accordingly, when the locking of the spindle servo of the spindle servo circuit 59 after a track jump is too slow, a track jump of 200 tracks is again carried out at step 117, and the routine 200 is again executed.

If, on the other hand, the condition (i) is established at step 211, i.e. the phase difference TH3 between the pulse PBV and the pulse REFV lies outside of the range of ±3%, then the processing of the microcomputer 70 proceeds from step 211 to the decision step 261. It is determined in step 261 whether the phase difference $TH_2$ is larger than or smaller than the phase difference $TH_3$. If $TH_3 \geq TH_2$, then the processing of the microcomputer 70 proceeds to step 262, whereat the following equation, $TH_1 = TH_3 - TH_2$ is calculated. If $TH_3 < TH_2$, then the processing of the microcomputer 70 proceeds to step 263, whereat TH=100% - $TH_2 + TH_3$ is calculated. In that case, the value $TH_2$ is the phase difference of the reproduced pulse PBV relative to the reference pulse REFV of one track jump before and which is calculated at step 203. Also, the value $TH_3$ is similar to the phase difference of one track after and which is calculated at step 206, whereby the value $TH_1$ indicates the amount by which the phase of the reproduced pulse PBV is changed by the one track jump.

Figure 11C:
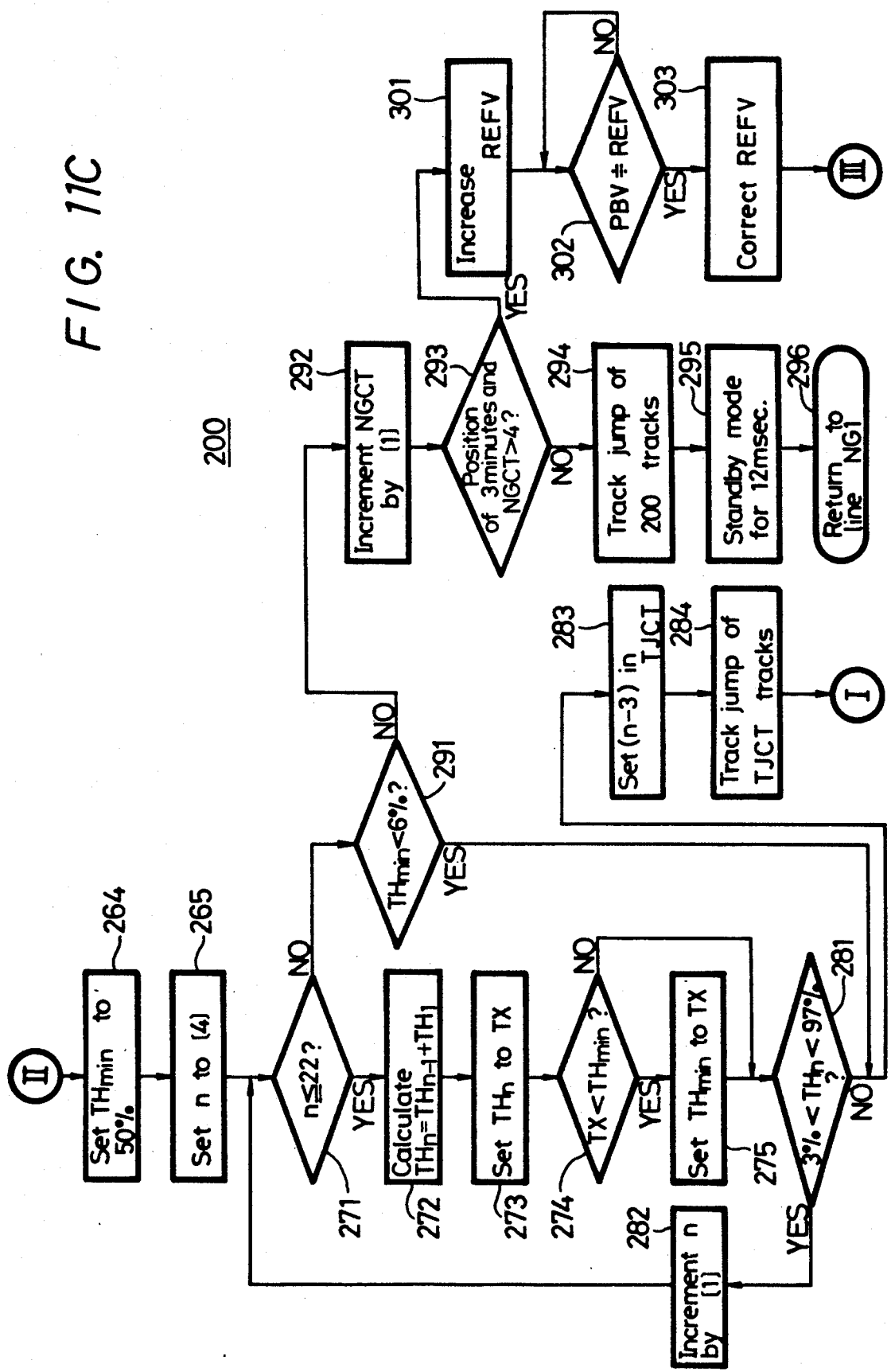

Then, the processing proceeds to step 264 (in FIG. 11C) from the step 262 or 263, and in step 264, a value $TH_{min}$ is set to 50%. The processing of the microcomputer 70 proceeds to step 265, whereat a fine track jump counter n made by the software, i.e., a counter for indicating the number of tracks jumped by the fine track jump, is set to [4]. The processing of the microcomputer 70 proceeds to the decision step 271. It is determined in step 271 whether or not the counter n is less that a predetermined value, e.g., if $n \leq 22$.

Assuming $n \leq 22$ is established, the processing of the microcomputer 70 proceeds from step 271 to step 272. In step 272, $TH_n = TH_{n-1} + TH_1$ is calculated. In that case, the value $TH_n$ indicates a phase difference between the reproduced pulse PBV and the reference pulse REFV when a track jump of (n−3) is performed. In the above-described equation, if the value $TH_n$ exceeds 100%, a value, which results from subtracting 100% from that value, becomes the value $TH_n$.

In the next step 273, an absolute value of the value $TH_n$ is set to a value TX, and the processing of the microcomputer 70 proceeds to the next decision step 274. It is determined at step 274 whether the value TX is larger than or smaller than the value $TH_{min}$ or vice versa. If $TV < TH_{min}$, then the processing of the microcomputer 70 proceeds to step 275, whereat the value $TH_{min}$ is set to the value TX, and the processing of the microcomputer 70 proceeds to the next decision step 281. It is determined in step 281 whether or not $TX \geq TH_{min}$ is established. If $TX \geq TH_{min}$ at step 274, then the processing of the microcomputer 70 proceeds directly to decision step 281. In step 281, it is determined whether or not the following condition (ii) is established:

$$3\% < TH_n < 97\% \tag{ii}$$

If the above condition (ii) is established, then the processing of the microcomputer 70 proceeds from step 281 to step 282, wherein the counter n is incremented by [1]and the, the processing of the microcomputer 70 returns to step 271.

Accordingly, if the inequality of $n \leq 22$ is established and the above-described condition (ii) is also established, the steps 271 to 282 are repeated.

However, when the condition (ii) is no longer established by the repetition of the steps 271 to 282, then the value $TH_n$ falls within±3%. In other words, when a track jump of (n−3) tracks is performed, the phase difference of the reproduced pulse PBV lies within±3%. In that case the processing of the microcomputer 70 proceeds from step 281 to step 283, whereat the value (n−3) is set in the counter TJCT. Then, the processing of the microcomputer 70 proceeds to step 284, wherein one track jump is carried out TJCT (=n−3) times on the basis of the signal TJMP. During this track jump, the error voltage TBCE of the TBC 25 is held by the signal HOLD, and at the completion of the track jump, the phase of the pulse REF-H is set in the phase of the pulse PRB2 by the signal HRES.

Then, the processing of the microcomputer 70 proceeds to step 213, accordingly, the routine 200 is ended through any one of the steps 233, 243, and 253.

During the repetition of the steps 271 to 282, if $n \leq 22$ is not established, the processing of the microcomputer 70 proceeds from step 271 to the next decision step 291. It is determined in step 291 whether or not $TH_{min} \leq 6\%$ is established. If $TH_{min} \leq 6\%$, then the processing of the microcomputer 70 proceeds from step 291 to step 283.

Accordingly, when a track jump of 20 tracks ($=n-3$) is performed, if the phase difference of the reproduced pulse PBV lies within $\pm 6\%$, a track jump of 20 tracks is performed at step 284, and the routine 200 is ended with any one of the steps 233, 243 and 253.

If $TH_{min} < 6\%$ is not established, as represented by a NO at step 291, then the processing of the microcomputer 70 proceeds from step 291 to step 292. In step 292, the counter NGCT is incremented by [1], and the processing of the microcomputer 70 proceeds to the next decision step 293 where it is determined whether or not the present track position falls within the position of three minutes of the time code of the optical video disc 10 and it is also determined whether or not an inequality of NGCT<4 is established. More specifically, even when the optical video disc 10 is recorded according to the CLV format, in a track region from a track starting point to a track point of about three minutes, the positions of the vertical synchronizing pulses PBV on the optical video disc 10 are substantially arranged in the radius direction of the optical video disc 10 like the CAV format. Accordingly, even if a track jump is carried out, the phase of the vertical synchronizing pulse PBV is not changed substantially. Further, when the routine 200 is repeated through the lines NG1 and NG2, the number of the repetitions is counted by the counter NGCT in the step 292.

Thus, the time code and the counter NGCT are checked at step 293. If the above items are not established, then it is regarded that a relationship between the photo pickup head 21 and the track position lies in the dead zone, and the processing of the microcomputer 70 proceeds from step 293 to step 294. In step 294, a forced sled feed pulse from the microcomputer 70 is supplied to the amplifier 43 to perform a fine sled feeding in addition to the sled feeding done by the sled pulse SLDP (the feed of the photo pickup head 21). At the same time, a track jump of, for example, 200 tracks is carried out by the pulse TJMP. In the next step 295, the microcomputer 70 is placed in a standby mode during a period of 12 milliseconds in order to stabilize the tracking. In the time period of the steps 294 and 295, the error voltage TBCE is held by the signal HOLD, and at the completion of the step 295, the phase of the pulse REFH is reset to that of the pulse PBH2 by the signal HRES.

When the step 295 is ended, the processing of the microcomputer 70 proceeds to step 296 and then the routine 200 is ended. Thereafter, the routine 200 is again executed through the line NG1. Accordingly, in the case of a dead zone, the routine 200 is repeated.

If it is determined that the conditions for the time code and the counter NGCT are established as represented by a YES at step 293, then the processing of the microcomputer 70 proceeds from step 293 to step 301. In step 301, the microcomputer 70 controls the signal generating circuit 61 so that the frequency of the reference pulse REFV is increased by, for example, 2.5%. In the next decision step 302, the phase difference between the reproduced pulse PBV and the reference pulse REFV is checked. If such a phase difference exceeds, for example, $\pm 3\%$, the step 302 is repeated.

If the phase difference between the pulse PBV and the pulse REFV falls within $\pm 3\%$, this is identified at step 302, and the processing of the microcomputer 70 proceeds from step 302 to step 303 where the frequency of the reference pulse REFV is converted to the correct vertical frequency, and then the processing of the microcomputer 70 proceeds to step 223. Thereafter, the routine 200 is ended at either of the steps 233 or 243.

As described above, according to the present invention, the processings of the following items I to VII are carried out:

I. A track jump of 200 tracks is performed for the scan reproduction (at step 116);

II. The microcomputer 70 is placed in a standby mode in order to stabilize the spindle servo (at step 117);

III. A track jump of one track is performed (at step 204);

IV. At that time, the error voltage TBCE of the TBC 25 is held and the phase of the reference horizontal synchronizing pulse REFH is controlled (at step 240);

V. The fine track jump is carried out such that the phase difference between the reproduced vertical synchronizing pulse PBV and the reference vertical synchronizing pulse REFV falls within a predetermined allowable error range (at step 284);

VI. The allowable value in the preceding item V is changed-over in two steps (at step 291); and VII. When the time code is set in a range of from 0 to 3 minutes and the dead zone decision count becomes 5 (NGCT=5), the frequency of the reference vertical synchronizing pulse REFV is changed to thereby match the phases of the pulses PBV and REFV (at steps 301 and 302).

Accordingly, in the scan reproduction mode, if the spindle servoing is performed with a delay time, owing to the items II to IV, the error voltage TBCE of the TBC 25 can be prevented from being fixed to the maximum value Eu or to the minimum value Ed and the TBC 25 operates normally.

Since the processing for the item V is performed after the items I to IV, in the scan reproduction, the vertical synchronization of the reproduced picture of the original video signal Sc can be prevented from being disturbed and also the upper half portion and the lower half portion of the picture can be prevented from being displayed in a reversed positional relationship.

Further, since the allowable value of the phase error of the reproduced synchronizing pulse PBV after the fine track jump is switched according to the item IV, the ratio of the gray picture based on the pseudo video signal Sq can be reduced to thereby increase the ratio of the reproduced picture based on the video signal Sc. This, it is possible to more positively determine the content and screen position of the scan-reproduced picture.

Furthermore, since the item VII is executed, even through the optical video disc 10 of the CLV format is placed in the state of the CAV (constant angular velocity) format in a range where the time code lies within a range of 0 to 3 minutes, the gray picture based on the pseudo video signal Sq can be prevented from being continued for very long. Thus, it is possible to obtain the reproduced picture based on the reproduced video signal Sc nearly immediately.

According to the experiments, the following results were obtained. When the scan reproduction is carried out in the fast rewind direction from the track position in which the time code indicates 3 minutes, if the item VII in not executed, the gray picture based on the pseudo video signal Sq lasts during a time period of longer that 4 seconds and the position is returned to the track starting point. Whereas, if the item VI is executed, the gray picture based on the pseudo video signal Sq can be returned to the reproduced picture based on the reproduced video signal Sc in 0.47 second.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

I claim as my invention

1. In a method for high-speed scanning by carrying out track jumps during reproduction of a video signal which was recorded in a constant linear velocity format on a disc using a video disc player of the type having a photo pickup head for reproducing a video signal having a time base from the video disc, a tracking servo circuit for servo-controlling the photo pickup head in tracking, a spindle servo circuit for controlling the video disc such that the video disc rotates at a constant linear velocity, and a time base corrector for generating an error voltage and using the error voltage for correcting the time base of the reproduced video signal, the high speed scanning method comprising the steps of:
  carrying out a first jump by the photo pickup head of a relatively large number of tracks of the video disc in its radial direction;
  keeping in a standby mode for a predetermined time period after the first track jump by the photo pickup head which is necessary for the spindle servo to be stabilized;
  carrying out a second jump by the photo pickup head after the standby mode;
  holding constant the error voltage of the time base corrector during the second track jump by the photo pickup head;
  generating a reference horizontal synchronizing pulse for a time base of the time base corrector and synchronizing the phase of the reference horizontal synchronizing pulse with that of a horizontal synchronizing pulse of the video signal derived from the time base corrector after the second track jump by the photo pickup head; and
  carrying out a third jump by the photo pickup head of one track of the video disc in its radial direction such that, after the synchronization, the phase of the vertical synchronizing pulse of the video signal from the time base corrector is synchronized with that of reference vertical pulse.

2. A method for reproducing a constant linear velocity format recorded video signal from a video disc in a high-speed scan reproduction mode by carrying out track jumps using a video disc player of the type having a photo pickup head for reproducing a video signal having a time base from the video disc, a tracking servo circuit for servo-controlling the photo pickup head in tracking, a spindle servo circuit for controlling the linear velocity of the video disc to be constant, a time base corrector for generating an error correction signal and using the error correction signal for correcting the time base of the reproduced video signal, means for generating a reference horizontal synchronizing pulse for a time base of the time base. corrector; and means for generating a reference vertical synchronizing pulse; wherein the method comprises the steps of:
  carrying out a first relatively large jump by the photo pickup head of tracks of the video disc in its radial direction;
  holding in a standby mode for a predetermined time period after the above-described jump by the photo pickup head to allow for the spindle servo to be stabilized;
  carrying out a second jump by the photo pickup head of one track after the standby mode;
  holding the error voltage of the time base corrector constant during the second jump by the photo pickup head;
  synchronizing the phase of the reference horizontal synchronizing pulse with that of a horizontal synchronizing pulse of a video signal derived from the time base corrector after the second jump by the photo pickup head;
  carrying out a third track jump by the photo pickup head if the phase of the vertical synchronizing pulse of the video signal from the time base corrector falls within a first allowable phase difference error range relative to the phase of the reference vertical synchronizing pulse due to a track jump by the photo pickup;
  checking whether or not the difference of the phases of the vertical synchronizing pulse of the videop signal and the vertical synchronizing pulse from the time base corrector fall within a second allowable phase difference error range which is larger than the first allowable phase difference error range if the phase of the vertical synchronizing pulse does not fall within the first allowable phase difference error range; and
  carrying out a fourth track jump by the photo pickup head instead of the third track jump by the photo pickup head if the phase of the vertical synchronizing pulse falls within the second allowable phase difference error range.

3. The method of claims 1 or 2, further comprising the additional steps of:
  producing and outputting a dummy signal instead of a reproduced video signal from the video disc after the first track jump by the photo pickup head; and
  outputting the reproduced video signal instead of the dummy signal when the vertical synchronizing pulse of the video signal from the time base corrector is synchronized in phase with the reference vertical synchronizing pulse after the third track jump by the photo pickup head is completed.

4. The method of claim 3, further comprising the step of substituting the reference vertical synchronizing pulse signal for the vertical synchronizing pulse signal of the reproduced video signal from the time base corrector before the dummy signal is output.

5. The method of claim 4, further comprising the step, during the period of the first track jump by the photo pickup head, of holding constant the error voltage of the time base corrector for a time period longer than at least the period of the first track jump.

6. The method of claim 2, wherein the first allowable phase difference is selected in a range of substantially $\pm 3\%$ and the second allowable phase difference is selected in a range of $\pm 6\%$ 7. A method for reproducing a constant linear velocity format required video signal from a video disc in a high-speed scan reproduction mode by carrying out track jumps using a video disc player of the type having a photo pickup head for reproducing a video signal from the video disc, a tracking servo circuit for servo-controlling the photo pickup head in tracking, a spindle servo circuit for controlling the linear velocity of the video disc to be constant, a time base corrector for generating an error correction signal and, by means of the error correction signal, correcting a time base of the video signal reproduced, means for generating a reference horizontal synchronizing pulse for a time base of the time base corrector; and means for generating a reference vertical synchronizing pulse; wherein the method comprises the steps of:

carrying out a first jump by the photo pickup head of a relatively large number of tracks of the video disc in its radial direction;

keeping the video disc player in a standby mode for a predetermined time period after the first track jump by the photo pickup head;

carrying out a second jump by the photo pickup head of a small number of tracks after the standby mode;

holding the error voltage of the time base corrector constant during the second track jump by the photo pickup head;

synchronizing the phase of the reference horizontal synchronizing pulse of the time base of the time base corrector with that of the horizontal synchronizing pulse of a video signal derived from the time base corrector after the second track jump by the photo pickup head;

carrying out a third jump by the photo pickup head if a phase of the vertical synchronizing pulse of the video signal from the time base corrector falls within a predetermined allowable phase difference error range relative to the reference vertical synchronizing pulse by the third track jump by the photo pickup head after the synchronization; and changing the frequency of the reference vertical synchronizing pulse by a predetermined frequency so that the reference vertical pulse is phase-locked to the vertical synchronizing pulse if the phase difference of the video signal vertical synchronizing pulse and the reference vertical synchronizing pulse does not fall within the predetermined allowable phase difference range.

8. A video disc player for reproducing a video disc recorded according to a constant linear velocity format, the video disc player comprising:

a photo pickup head for reproducing a video signal from the video disc;

a tracking servo circuit for servo-controlling the photo pickup head in tracking;

a spindle servo circuit for controlling the linear velocity of the video disc to be constant;

a time base corrector for generating an error correction signal and, by means of the error correction signal, correcting a time base of the video signal reproduced;

means for generating a reference horizontal synchronizing pulse for the time base of the time base corrector; and means for generating a reference vertical synchronizing pulse; and scan reproduction means for reproducing the recorded video signals from the disc at high speed by carrying out track jumps and including:

a circuit for carrying out a first jump by the photo pickup head of a relatively large number of tracks in the radial direction of the video disc;

a circuit for causing the scan reproduction means to carry out a standby mode for a predetermined time period after the first track jump by the photo pickup head;

a circuit for carrying out a second jump by the photo pickup head of one track after the standby mode;

a circuit for holding constant the error voltage of the time base corrector during the second track jump;

a circuit for synchronizing the phase of the reference horizontal synchronizing pulse with that of a horizontal synchronizing pulse of a video signal derived from the time base corrector after the second jump by the photo pickup head; and a circuit for carrying out a third jump by the photo pickup head of one track of the video disc in its radial direction such that, after the synchronization, the phase of the vertical synchronizing pulse of the video signal from the time base corrector is synchronized with that of reference vertical pulse.

9. The video disc player according to claim 8, wherein the time base corrector circuit is provided with a circuit for generating and substituting a reference vertical synchronizing pulse for the vertical synchronizing pulse signal in the output video signal from the time base corrector.

10. The video disc player according to claim 9, wherein the time base corrector circuit further includes a circuit for replacing the video output of the time base corrector with a dummy signal during a period from immediately before the first track jump to a period in which a vertical synchronizing pulse in the video signal from the time base corrector is synchronized with the reference vertical synchronizing pulse.

11. The video disc player according to claim 10, wherein the dummy signal is a signal which becomes a gray video signal when visually reproduced by the picture screen of a television receiver.

* * * * *